(12) United States Patent
Kwon et al.

(10) Patent No.: US 12,136,979 B2
(45) Date of Patent: Nov. 5, 2024

(54) METHOD AND APPARATUS FOR MATRIX ENHANCEMENT IN MIMO RECEIVER WITH DEEP LEARNING

(71) Applicant: Samsung Electronics Co., Ltd., Gyeonggi-do (KR)

(72) Inventors: Hyukjoon Kwon, San Diego, CA (US); Shailesh Chaudhari, San Diego, CA (US); Dongwoon Bai, San Diego, CA (US)

(73) Assignee: Samsung Electronics Co. Ltd (KR)

( * ) Notice: Subject to any disclaimer, the term of this patent is extended or adjusted under 35 U.S.C. 154(b) by 3 days.

(21) Appl. No.: 17/988,244

(22) Filed: Nov. 16, 2022

(65) Prior Publication Data
US 2024/0113759 A1    Apr. 4, 2024

Related U.S. Application Data

(60) Provisional application No. 63/409,940, filed on Sep. 26, 2022.

(51) Int. Cl.
*H04L 1/02* (2006.01)
*H04B 7/06* (2006.01)
*H04B 7/08* (2006.01)

(52) U.S. Cl.
CPC ......... *H04B 7/0634* (2013.01); *H04B 7/0639* (2013.01); *H04B 7/0857* (2013.01)

(58) Field of Classification Search
CPC ... H04B 7/0634; H04B 7/0639; H04B 7/0857
USPC ........................................................ 375/267
See application file for complete search history.

(56) References Cited

U.S. PATENT DOCUMENTS

| | | | | |
|---|---|---|---|---|
| 7,653,160 B2 * | 1/2010 | Piirainen | ............... | H04B 17/373 375/349 |
| 8,121,210 B2 * | 2/2012 | Cho | ..................... | H04B 7/0413 375/267 |
| 8,149,791 B2 | 4/2012 | Li et al. | | |
| 9,160,383 B2 * | 10/2015 | Chen | .................... | H04B 1/1027 |
| 9,231,632 B2 | 1/2016 | Kang et al. | | |
| 11,387,871 B2 | 7/2022 | Piirainen et al. | | |
| 2007/0072551 A1 * | 3/2007 | Pajukoski | ............ | H04B 7/0857 455/501 |
| 2007/0164902 A1 * | 7/2007 | Bang | ...................... | H04B 7/086 342/377 |

FOREIGN PATENT DOCUMENTS

WO    WO 2022/062868    3/2022

OTHER PUBLICATIONS

Chaudhari, Shailesh et al., "Machine Learning based Interference Whitening in 5G NR MIMO Receiver", arXiv:2207.03010v1 [cs.IT] Jul. 6, 2022, pp. 6.

* cited by examiner

*Primary Examiner* — Helene E Tayong
(74) *Attorney, Agent, or Firm* — The Farrell Law Firm, P.C.

(57) ABSTRACT

A method and an apparatus are provided in which a vector is generated from a covariance matrix of a received signal. The vector is input to a neural network to obtain an enhanced vector. The enhanced vector is converted into an enhanced matrix. Interference whitening is performed on the received signal using a whitening filter based on the enhanced matrix.

20 Claims, 10 Drawing Sheets

METHOD AND APPARATUS FOR MATRIX ENHANCEMENT IN MIMO RECEIVER WITH DEEP LEARNING

CROSS-REFERENCE TO RELATED APPLICATION(S)

This application claims the priority benefit under 35 U.S.C. § 119(e) of U.S. Provisional Application No. 63/409,940, filed on Sep. 26, 2022, the disclosure of which is incorporated by reference in its entirety as if fully set forth herein.

TECHNICAL FIELD

The disclosure generally relates to co-channel interference (CCI) mitigation at a user equipment (UE) in a wireless network. More particularly, the subject matter disclosed herein relates to improvements to covariance matrix estimation in applying interference whitening (IW) for CCI mitigation.

SUMMARY

In wireless networks (e.g., fifth generation (5G) or sixth generation (6G) networks), CCI at a UE may be high due to dense deployment and high frequency reuse within the network.

To solve this problem at the UE, CCI can be mitigated by applying spatial domain IW in a multiple-input multiple-output (MIMO) receiver. An IW module in the MIMO receiver applies a spatial domain whitening filter to the received signal and estimated channel. The spatial domain whitening filter is computed from an interference-plus-noise covariance matrix. In order to achieve a low error rate, it is important to use an accurate covariance matrix for IW. The covariance matrix is estimated using knowledge of transmitted pilots at reference symbols (RS), such as, for example, demodulation reference symbols (DMRS), and an estimated channel at RS resource elements (REs).

One issue with the above approach is that the number of RS REs are limited in one resource block (RB), which may lead to an estimated covariance matrix of poor quality.

To overcome these issues, systems and methods are described herein for enhancing the estimated covariance matrix using a deep neural network.

The above approach improves on previous methods because it does not rely on taking an average of interference-plus-noise over a large portion of the signal bandwidth and does not suffer from poor estimation quality when the interference is frequency selective or present in a small portion of the bandwidth.

In an embodiment, a method is provided in which a vector is generated from a covariance matrix of a received signal. The vector is input to a neural network to obtain an enhanced vector. The enhanced vector is converted into an enhanced matrix. Interference whitening is performed on the received signal using a whitening filter based on the enhanced matrix.

In an embodiment, a UE is provided that includes a processor and a non-transitory computer readable storage medium storing instructions. When executed, the instructions cause the processor to generate a vector from a covariance matrix of a received signal, input the vector to a neural network to obtain an enhanced vector, convert the enhanced vector into an enhanced matrix, and perform interference whitening on the received signal using a whitening filter based on the enhanced matrix.

In an embodiment, a method is provided in which a matrix is generated from a received signal. An enhanced matrix is generated using learning-based enhancement. Interference whitening is performed on the received signal using a whitening filter based on an inverse of the enhanced matrix. Bits from the received signal are detected and decoded after interference whitening.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
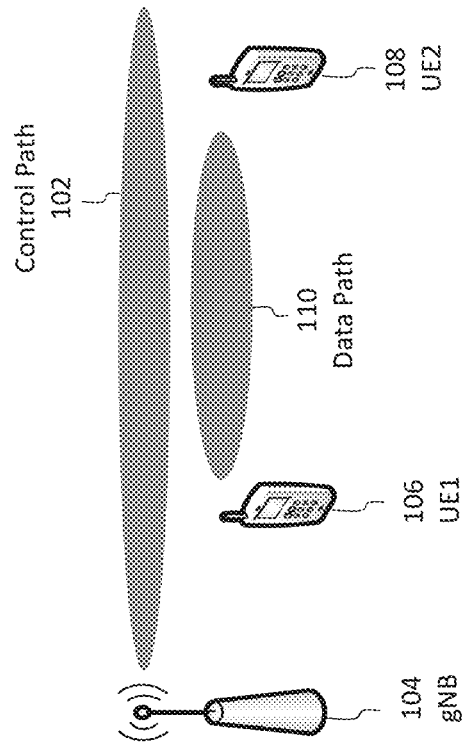
FIG. 1 is diagram illustrating a communication system, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purposes only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

FIG. 1 is a diagram illustrating a communication system, according to an embodiment. In the architecture illustrated in FIG. 1, a control path 102 may enable the transmission of control information through a network established between a gNodeB (gNB) 104, a first UE 106, and a second UE 108. A data path 110 may enable the transmission of data (and some control information) on a sidelink (SL) between the first UE 106 and the second UE 108. The control path 102 and the data path 110 may be on the same frequency or may be on different frequencies.

Figure 2:
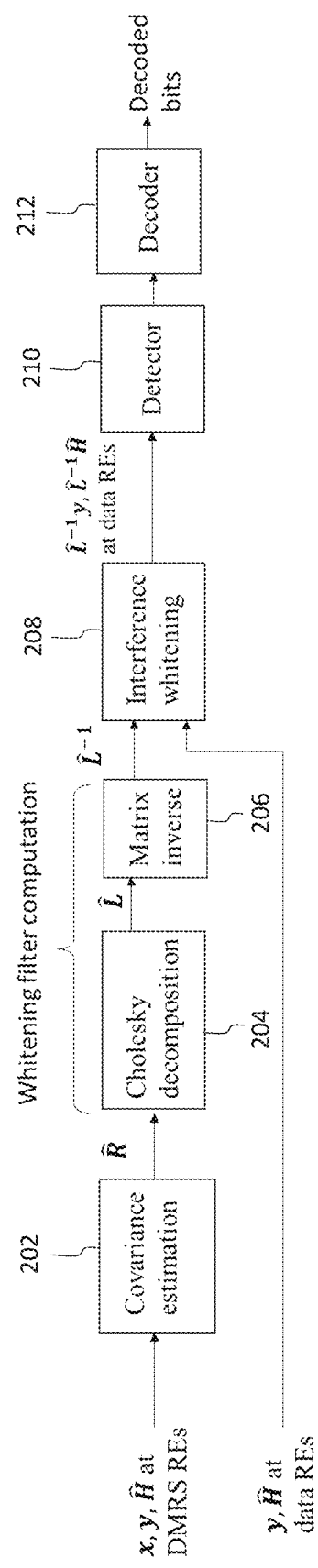
FIG. 2 is a diagram illustrating an IW process, according to an embodiment.
Figure 3:
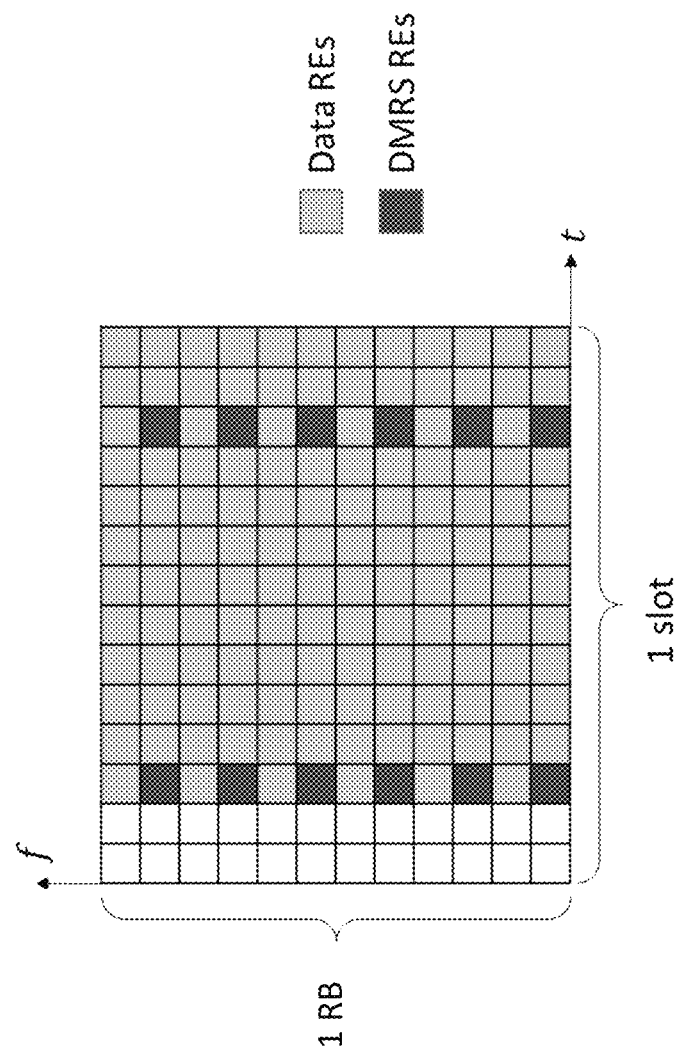
FIG. 3 is a diagram illustrating DMRS REs in an RB, according to an embodiment.

FIG. 2 is a diagram illustrating an IW process, according to an embodiment. The IW process may be performed on a signal received at a UE. At a covariance estimation module 202, an estimated interference-plus-noise covariance matrix $\hat{R}$ (also referred to as "covariance matrix" herein) may be determined using transmitted signal x, received signal y, and channel $\hat{H}$ at DMRS REs. Specifically, covariance matrix $\hat{R}$=Average $(y-\hat{H}x)(y-\hat{H}x)^*$ over RS REs. FIG. 3 is a diagram illustrating 12 DMRS REs in a single RB, according to an embodiment. The 12 DMRS REs may be used in determining the covariance matrix. Here, y=Hx+w is a received signal vector of size M×1, where M is equal to the number of receiver antennas.

A whitening filter computation is performed at modules 204 and 206. Specifically, at a Cholesky decomposition module 204, Cholesky decomposition may be performed on the estimated covariance matrix $\hat{R}$ to obtain a lower triangular matrix $\hat{L}$, such that $\hat{R}=\hat{L}\hat{L}^*$. At a matrix inverse module 206, matrix inverse may be performed on the lower triangular matrix $\hat{L}$ to obtain inverse matrix $\hat{L}^{-1}$. At an IW module 208, the whitening filter may be applied at data REs of the RB using y, $\hat{H}$, and $\hat{L}^{-1}$, resulting in $\hat{L}^{-1}y, \hat{L}^{-1}H$. This result of the IW module 208 may be input to a detector 210 and a decoder 212 to output decoded bits of the received signal.

Figure 4:
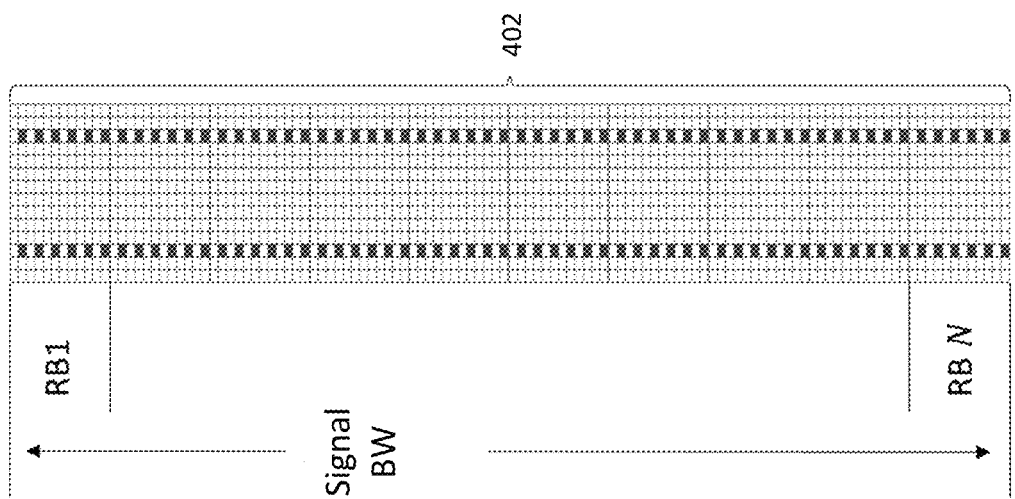
FIG. 4 is a diagram illustrating wideband IW, according to an embodiment.

FIG. 4 is a diagram illustrating wideband IW, according to an embodiment. The number of RS samples may be increased by averaging an entire signal bandwidth 402 having multiple RBs ($RB_1$ to $RB_N$). Specifically, covariance matrix $\hat{R}_{wide}$=Average $(y-\hat{H}x)(y-\hat{H}x)^*$ over all DMRS REs in the bandwidth. However, wideband IW may be ineffective if interference distribution varies across the signal bandwidth. For example, all band interference may occur with a frequency selective interference channel, interference may occur over a narrow band, or there may be interlaced interference. In these cases, the interference-plus-noise distribution may not be the same for all RBs of the bandwidth. Therefore, taking an average over an entire bandwidth may degrade the quality of the covariance matrix and may result in a high error rate.

Figure 5:
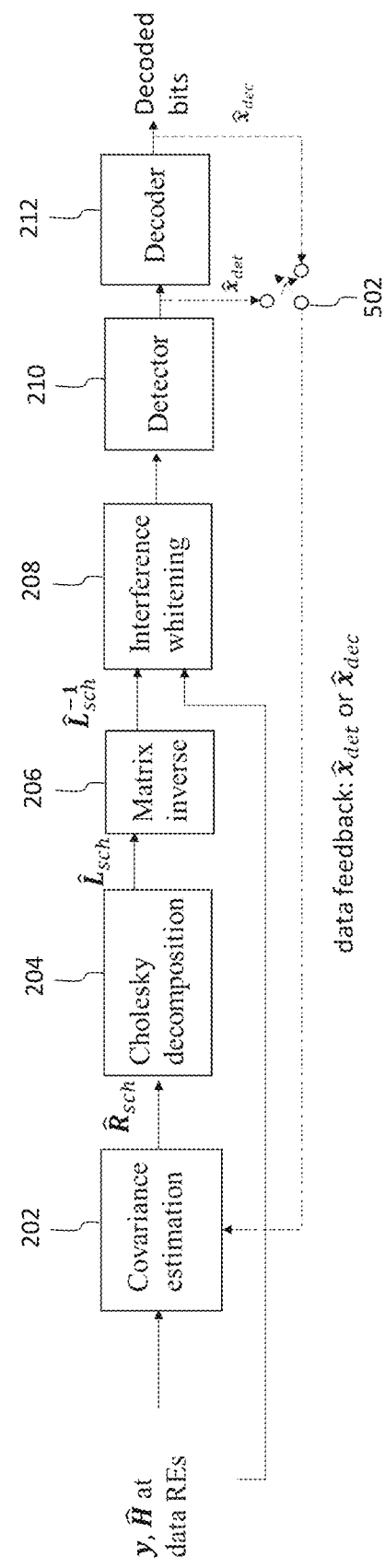
FIG. 5 is a diagram illustrating a data-aided IW process, according to an embodiment.

FIG. 5 is a diagram illustrating a data-aided IW process, according to an embodiment. Data-aided IW may increase samples that are used in averaging by using detected data symbols $\hat{x}_{det}$ output at the detector 210 or decoded data symbols $\hat{x}_{dec}$ output at the decoder 212 in a feedback loop to the covariance estimation module 202. These data symbols are represented by the data REs in the RB of FIG. 3. A switch 502 may be disposed in the feedback loop for selection of either detected data symbols $\hat{x}_{det}$ or decoded data symbols $\hat{x}_{dec}$ as feedback. The iterative version of the covariance matrix is denoted as $\hat{R}_{sch}$, the iterative version of the lower triangular matrix is denoted as $\hat{L}_{sch}$, and the iterative version of the matrix inverse is denoted as $\hat{L}^{-1}_{sch}$. Accordingly, at least a second iteration of the IW block 208, the detector 210, and the decoder 212 may be performed.

Figure 6A:
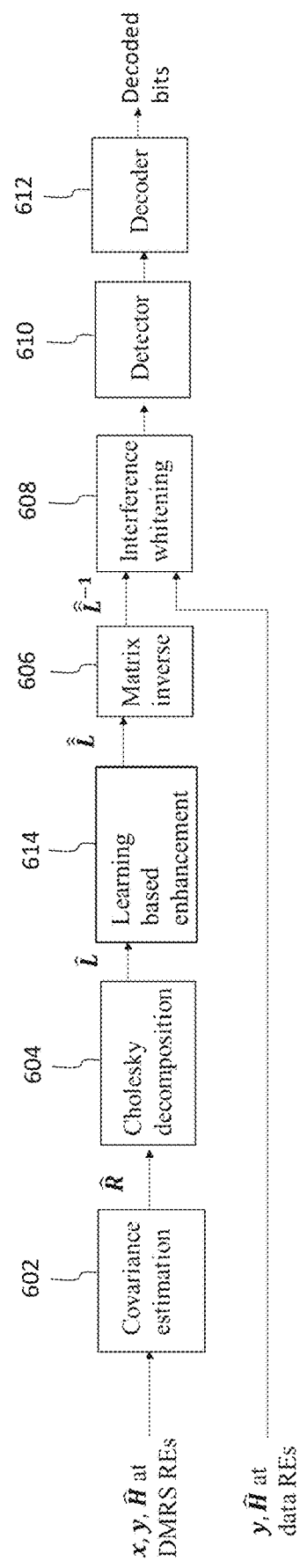
FIGS. 6A and 6B are diagrams illustrating an IW process with deep learning, according to embodiments.
Figure 6B:
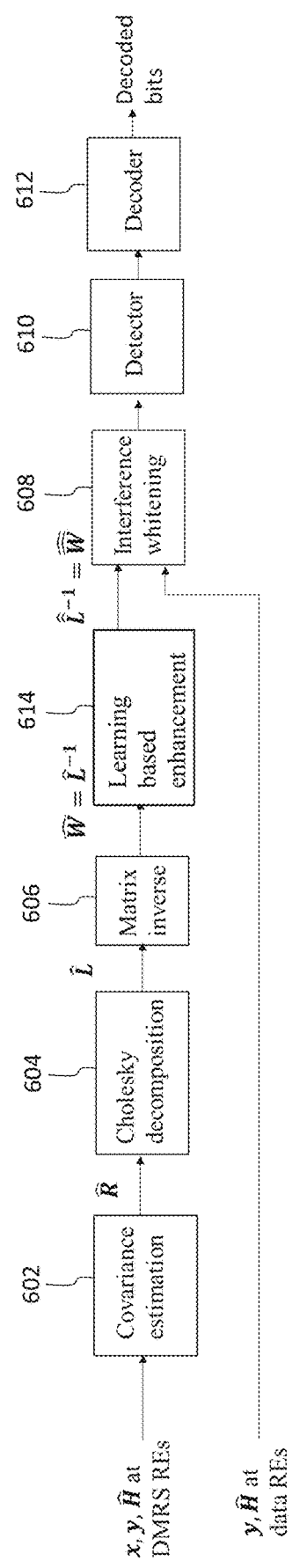

FIGS. 6A and 6B are diagrams illustrating an IW process, according to embodiments. Generally, modules 602, 604, 606, 608, 610, and 612 of FIGS. 6A and 6B correspond to modules 202, 204, 206, 208, 210, and 212, respectively, of FIG. 2, and operate in a similar manner.

Referring initially to FIG. 6A, a covariance matrix $\hat{R}$ may be estimated as a positive definite matrix, at covariance estimation module 602. In order to maintain positive definiteness of the enhanced matrix, the estimated covariance matrix may be decomposed into a lower triangular matrix $\hat{L}$ with Cholesky factorization, at Cholesky decomposition module 604. The elements of the lower triangular matrix $\hat{L}$ (e.g., the lower triangular Cholesky factorization of the estimated covariance matrix) may be set as inputs to a learning based enhancement module 614. The output of the learning based enhancement module 614 may be an enhanced lower triangular matrix $\hat{\tilde{L}}$ (e.g., an enhanced lower triangular Cholesky factorization). In order to maintain positive definiteness of the covariance matrix, the activation functions of outputs of the neural network may be set appropriately to ensure the diagonal elements of the enhanced lower triangular matrix remain positive.

The enhanced lower triangular matrix $\hat{\tilde{L}}$ may be input to a matrix inverse module 606. The enhanced lower triangular matrix $\hat{\tilde{L}}$ may also be used to reconstruct an enhanced covariance matrix, which is described in greater detail below with respect to FIG. 8. A whitening filter may be configured using the enhanced covariance matrix or the inverted enhanced lower triangular matrix.

While FIG. 6A depicts the matrix inverse module 606 after the learning-based enhancement module 614, the matrix inverse module 606 may instead be after the Cholesky decomposition module 604, as shown in FIG. 6B. Accordingly, in the embodiment of FIG. 6B, the matrix inverse module 606 computes a matrix inverse of the lower triangular matrix $\hat{L}$. The matrix inverse of the lower triangular matrix $\hat{L}$ is a whitening filter $\hat{W}$, which may be used as an input into the learning-based enhancement module 614 to directly obtain an enhanced whitening filter $\hat{\tilde{W}}$. The remainder of the process is similar in FIGS. 6A and 6B, as described below.

Interference whitening may be performed on the received signal using the whitening filter configured based on the inverted enhanced lower triangular matrix $\hat{\tilde{L}}^{-1}$, or using the enhanced whitening filter $\hat{\tilde{W}}$, at an IW module 608, at data REs using y, $\hat{H}$, and $\hat{\tilde{L}}^{-1}$ or $\hat{\tilde{W}}$, resulting in $\hat{\tilde{L}}^{-1}$ y, $\hat{\tilde{L}}^{-1}\hat{H}$ or $\hat{\tilde{W}}$y, $\hat{\tilde{W}}\hat{H}$. This output of the IW module 608 may be used at a detector 610 and a decoder 612 to output decoded bits of the received signal.

Accordingly, a deep neural network may be added in the MIMO receiver, thereby enhancing the quality of the enhanced lower triangular matrix and the estimated interference-plus-noise covariance matrix. The matrix enhancement of FIGS. 6A and 6B may be applied using an estimated covariance matrix from a single RB or a chunk of RBs within a bandwidth.

Further, this disclosure does not rely on taking an average of interference-plus-noise over a large portion of signal bandwidth. Therefore, it does not suffer from poor estimation quality when the interference is frequency selective or the interference is present in a small portion signal bandwidth. This disclosure also does not require extra iterations of the IW module 608, the detector 610, and the decoder 612.

Figure 7:
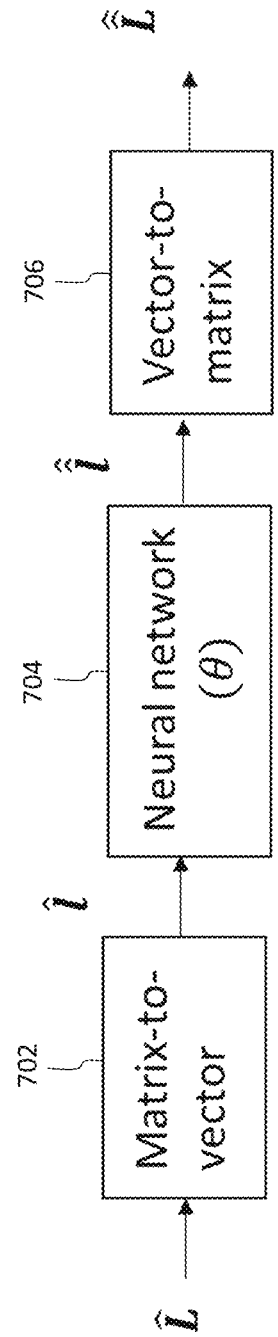
FIG. 7 is a diagram illustrating learning based enhancement in a MIMO receiver, according to an embodiment.

FIG. 7 is a diagram illustrating learning based enhancement in a MIMO receiver, according to an embodiment. Specifically, FIG. 7 is a detailed description of the learning based enhancement module 614 of FIG. 6A. The lower triangular matrix $\hat{L}$ output from the Cholesky decomposition module 604 of FIG. 6A may be input to a matrix-to-vector module 702, which outputs a vectorized form of the lower triangular matrix $\hat{l}$. The vectorized form of the lower triangular matrix $\hat{l}$ may be input to a neural network module 704, upon which training data θ has been applied. The neural network module 704 may output an enhanced vectorized form of the lower triangular matrix $\hat{\tilde{l}}$, which is input to a vector-to-matrix module 706. The vector-to-matrix module 706 may output the enhanced lower triangular matrix $\hat{\tilde{L}}$ to the matrix inverse module 606 of FIG. 6A.

An example of the lower triangular matrix $\hat{L}$ that is input to the matrix-to-vector module 702 is set forth as Equation (1) below.

$$\hat{L} = \begin{bmatrix} a_{11} & 0 & 0 & 0 \\ a_{21} & a_{22} & 0 & 0 \\ a_{31} & a_{32} & a_{33} & 0 \\ a_{41} & a_{42} & a_{43} & a_{44} \end{bmatrix} = M \times M \text{ lower triangular matrix} \quad (1)$$

An example of the vectorized form of the lower triangular matrix $\hat{l}$ output from the matrix-to-vector module 702 and input to the neural network module 704 is set forth as Equation (2) below.

$$\hat{l} = vec(\hat{L}) = \quad (2)$$
$$[a_{11}, a_{22}, a_{33}, a_{44}, \text{Re}(a_{21}), \text{Im}(a_{21}), \text{Re}(a_{31}), \text{Im}(a_{31}), \ldots, \text{Re}(a_{43}), \text{Im}(a_{43})]^T$$
$$= M^2 \times 1 \text{ vector}$$

where Re( . . . ) indicates a real part of a complex number and Im( . . . ) indicates an imaginary part of a complex number.

An example of the enhanced vectorized form of the lower triangular matrix $\hat{\tilde{l}}$ output from the neural network module 704 and input to the vector-to-matrix module 706 is set forth as Equation (3) below.

$$\hat{l} = vec(\hat{L}) = \tag{3}$$

$$[b_{11}, b_{22}, b_{33}, b_{44}, \text{Re}(b_{21}), \text{Im}(b_{21}), \text{Re}(b_{31}), \text{Im}(b_{31}), \ldots, \text{Re}(b_{43}), \text{Im}(b_{43})]^T$$

$$= M^2 \times 1 \text{ vector}$$

An example of the enhanced lower triangular matrix $\hat{L}$ output from the vector-to-matrix module 706 is set forth as Equation (4) below.

$$\hat{L} = \begin{bmatrix} b_{11} & 0 & 0 & 0 \\ b_{21} & b_{22} & 0 & 0 \\ b_{31} & b_{32} & b_{33} & 0 \\ b_{41} & b_{42} & b_{43} & b_{44} \end{bmatrix} \tag{4}$$

Figure 8:
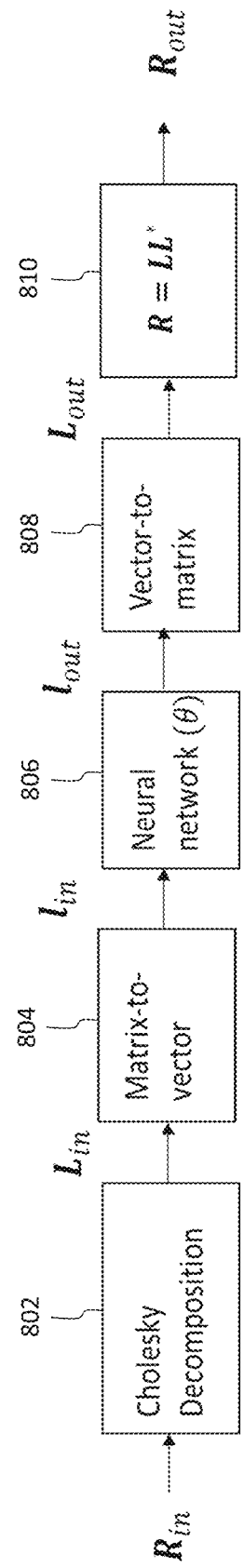
FIG. 8 is a diagram illustrating learning based enhancement resulting in an enhanced covariance matrix, according to an embodiment.

FIG. 8 is a diagram illustrating learning based enhancement resulting in an enhanced covariance matrix, according to an embodiment. An estimated covariance matrix $R_{in}$ of size N×N may be input to a Cholesky decomposition module 802, where N is the number of receiver antennas. $R_{in}$ of FIG. 8 corresponds to $\hat{R}$ of FIG. 6A. The Cholesky decomposition module 802 may output a corresponding lower triangular matrix $L_{in}$, which is a lower triangular Cholesky factorization of $R_{in}$ such that $R_{in}=L_{in}L_{in}^*$. $L_{in}$ of FIG. 7 corresponds to $\hat{L}$ of FIG. 6A. The lower triangular matrix $L_{in}$ may be input to a matrix-to-vector module 804, which may output a vectorized form of the lower triangular matrix $l_{in}$, which corresponds to $\hat{l}$ of FIG. 7. The vectorized form of the lower triangular matrix $l_{in}$ may be input to a neural network module 806, which may output an enhanced vectorized form of the lower triangular matrix $l_{out}$, corresponding to $\hat{l}$ of FIG. 7. The enhanced vectorized form of the lower triangular matrix $l_{out}$ may be input to a vector-to-matrix module 808, which may output an enhanced lower triangular matrix $L_{out}$ (e.g., an enhanced version of the Cholesky factorization). $L_{out}$ of FIG. 8 corresponds to $\hat{L}$ of FIG. 7. The enhanced lower triangular matrix $L_{out}$ may be converted into an enhanced covariance matrix $R_{out}$ at module 810. $L_{out}$ is the lower triangular Cholesky factorization of $R_{out}$ such that $R_{out}=L_{out}L_{out}^*$.

Considering a received signal with B RBs in the bandwidth part (BWP), the RBs are indexed by 'b'. As interference may not be present in each RB in the BWP, a set of RBs containing interference is denoted by $S_I$. The set $S_I$ indicates the interference distribution in the BWP (e.g., which RBs within the BWP have interference). A set of REs in the b-th RB is denoted by $S_b$. Accordingly, a received signal $y_n$ at the UE in the n-th RE is set forth in Equation (5) below.

$$y_n = \begin{cases} H_n x_n + H_{I,n} x_{I,n} + w_n, & \text{if } n \in S_b \text{ and } b \in S_I \\ H_n x_n + w_n, & \text{if } n \in S_b \text{ and } b \notin S_I \end{cases} \tag{5}$$

where $H_n$ is a channel between a transmitter and a UE, $x_n$ is a transmitted signal, $H_{I,n}$ is an interference channel, $x_{I,n}$ is interference symbols, and $w_n$ is a noise vector.

The estimated covariance matrix $R_{in,b}$ for RB b may be computed by averaging interference-plus-noise at RS REs, for example, DMRS REs as set forth in Equation (6) below.

$$R_{in,b} = \frac{1}{|S_{DMRS,b}|} \sum_{n \in S_{DMRS,b}} \left[(y_n - \hat{H}_n x_n)(y_n - \hat{H}_n x_n)^*\right] \tag{6}$$

where $S_{DATA,b}$ is a set of DMRS REs in the b-th RB, $|S_{DATA,b}|$ is the cardinality of the set of DMRS REs, $\hat{H}_n$ is an estimated channel at the DMRS RE, and $x_n$ is a transmitted DMRS pilot.

An ideal covariance matrix $R_{ideal,b}$ is a matrix computed by averaging interference-plus-noise over physical downlink shared channel (PDSCH) data REs with a genie knowledge of transmitted symbols $x_n$, as shown in Equation (7) below.

$$R_{ideal,b} = \frac{1}{|S_{DATA,b}|} \sum_{n \in S_{DATA,b}} \left[(y_n - \hat{H}_n x_n)(y_n - \hat{H}_n x_n)^*\right] \tag{7}$$

where $S_{DATA,b}$ is a set of PDSCH data REs in the b-th RB, and $|S_{DATA,b}|$ is the cardinality of this set of PDSCH data REs.

Covariance matrix enhancement may be performed at each RB separately. Thus, the disclosure of FIG. 8 may be applied for each covariance matrix $R_{in,b}$ to obtain enhanced Cholesky factorization $L_{out,b}$ and enhanced covariance $R_{out,b}$. Further, received signals and estimated matrices at PDSCH data REs within RB b may be whitened with whitening filter $L_{out,b}^{-1}$.

An RB chunk is defined as a set of M consecutive RBs, where M=1, 2, . . . , and C is a total number of RB chunks in the BWP. A covariance matrix is estimated for RB chunk c as set forth in Equation (8) below.

$$R_{in,c} = \frac{1}{M} \sum_{b \in S_c} R_{in,b} \tag{8}$$

where $S_c$ is a set of RB indices in RB chunk c.

An ideal covariance matrix for chunk c is similarly defined for per chunk operation, as set forth in Equation (9) below.

$$R_{ideal,c} = \frac{1}{M} \sum_{b \in S_c} R_{ideal,b} \tag{9}$$

Covariance matrix enhancement may be separately performed at each RB chunk. Thus, the process of FIG. 8 may be applied for each covariance matrix $R_{in,c}$ to obtain enhanced Cholesky factorization $L_{out,c}$ and enhanced covariance matrix $R_{out,c}$. Received signals and estimated matrices at PDSCH data REs within RB chunk c are whitened with whitening filter $L_{out,c}^{-1}$.

The whitened received signal vectors and estimated matrices at PDSCH data REs may be further processed at symbol detector and decoder, as described above with respect to FIG. 6A.

The covariance matrix is a Hermitian matrix and a positive definite matrix. Since a positive definite property at the output of the neural network is not automatically maintained, instead of directly obtaining the enhanced covariance matrix at the neural network output, an enhanced lower triangular Cholesky factorization of the covariance matrix is obtained.

By ensuring that diagonal elements of $L_{out}$ are positive, it is ensured that the matrix $R_{out}=L_{out}L_{out}^*$ is positive definite.

Pre-processing before the neural network includes Cholesky factorization, at the Cholesky decomposition module 804, in which a lower triangular matrix $L_{in}$ may be obtained by Cholesky factorization such that $R_{in}=L_{in}L_{in}^*$. Pre-processing also includes matrix-to-vector conversion (vectorization), at matrix-to-vector module 804, in which matrix $L_{in}$ may be converted into a vector $l_{in}$. Vector $l_{in}$ may be obtained as set forth in Equation (10) below.

$$l_{in} = \begin{bmatrix} L_{in}(1,1), L_{in}(2,2), \ldots, L_{in}(N,N), \text{Re}\{L_{in}(2,1)\}, \text{Im}\{L_{in}(2,1)\}, \\ \text{Re}\{L_{in}(3,1)\}, \text{Im}\{L_{in}(3,1)\}, \text{Re}\{L_{in}(3,2)\}, \text{Im}\{L_{in}(3,2), \ldots \\ \text{Im}\{L_{in}(4,3)\}, \text{Im}\{L_{in}(4,4)\} \end{bmatrix}^T \quad (10)$$

where $L_{in}(i,j)$ is the element at ith row and jth column in the lower triangular matrix $L_{in}$ and Re{ . . . } and Im{ . . . } indicate real and imaginary parts of a complex number.

In the vectorization of Equation (10), the first N elements are the diagonal elements of $L_{in}$, which are real numbers. The remaining elements of the vector are real and imaginary parts below the diagonal in matrix $L_{in}$. If the size of $L_{in}$ is N×N, then the size of the vector $l_{in}$ is $N^2 \times 1$.

In post-processing, vector to matrix conversion at the vector-to-matrix module 808, the output vector is $l_{out}$ of size $N^2 \times 1$. The relationship between the vector $l_{out}$ and the matrix $L_{out}$ is the same as shown for $l_{in}$ and $L_{in}$ in Equation (10).

In the neural network structure at the neural network module 806, the number of hidden layers may be ≥2. For the activation function, at hidden nodes, activation may be through rectified linear units (reLU) or a sigmoid function, for example. However, any other activation may be used. At output nodes, for nodes corresponding to diagonal elements of $L_{out}$, a softplus activation function $y=1/(1+\exp(-x))$ may be applied. This ensures that the diagonal elements of $L_{out}$ are positive and the matrix $R_{out}$ is positive definite. For nodes corresponding to non-diagonal elements of $L_{out}$, identity activation is used (y=x).

In training the deep neural network, for a per RB operation, training samples are $l_{in,b}$ at input and $l_{ideal,b}$ at the output of neural network. The vector $l_{ideal,b}$ is obtained by Cholesky factorization followed by matrix-to-vector conversion of $R_{ideal,b}$.

The training dataset is generated under different interference scenarios (e.g., interlaced interference, all band interference, and narrowband interference), signal-to-interference ratios (SIRs) (e.g., low to high), signal-to-noise ratios (SNR) (e.g., low to high), and/or channel models (extended pedestrian A (EPA)-5, extended vehicular A (EVA)-30, and tapped delay line (TDL)). The neural network is trained to minimize the mean square error (MSE) as set forth in Equation (11) below.

$$\frac{1}{KN^2} \sum_k \sum_i (l_{out,b}^{(k)}(i) - l_{ideal,b}^{(k)}(i))^2 \quad (11)$$

where k indicates a kth training sample and i indicates an ith element of the vector.

Figure 9:
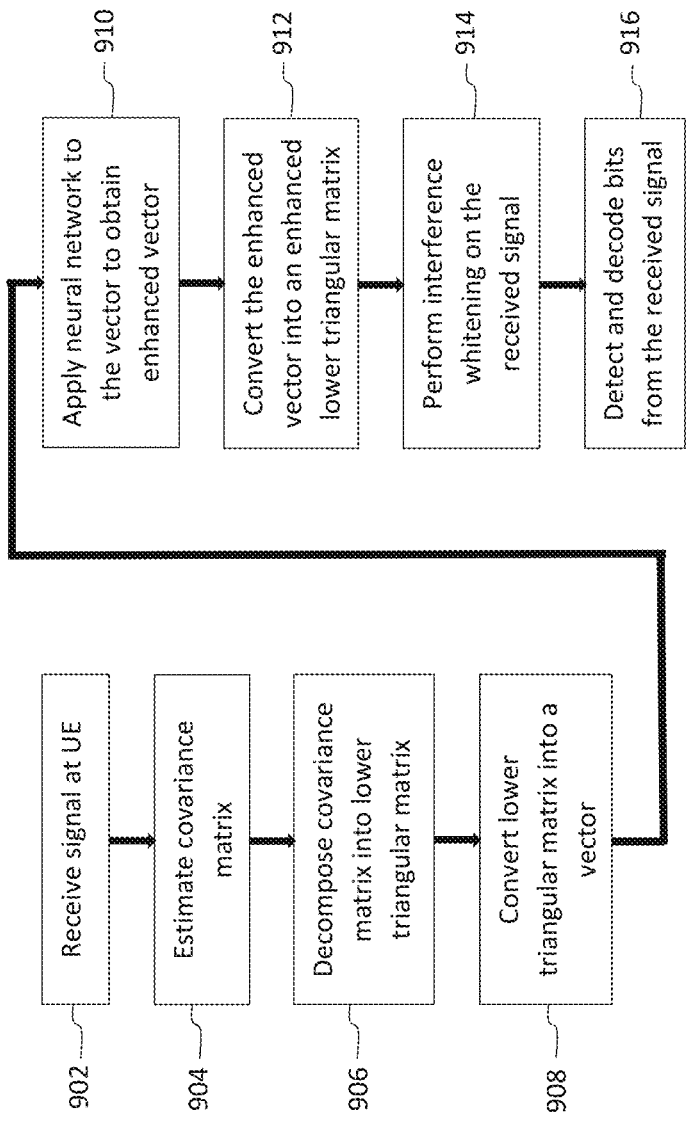
FIG. 9 is a flowchart illustrating a method for matrix enhancement in a MIMO receiver with deep learning, according to an embodiment.

FIG. 9 is a flowchart illustrating a method for matrix enhancement in a MIMO receiver with deep learning, according to an embodiment.

At 902, a signal may be received at the UE. At 904, a covariance matrix of the received signal may be estimated. The covariance matrix is a positive definite matrix that is estimated using interference-plus-noise of RS REs of one or more consecutive RBs in a bandwidth. At 906, the estimated covariance matrix may be decomposed into a lower triangular matrix. The lower triangular matrix is a Cholesky factorization matrix.

At 908, the lower triangular matrix may be converted into a vector. At 910, a neural network may be applied to the vector to obtain an enhanced vector. At 912, the enhanced vector may be converted into an enhanced lower triangular matrix. Activation functions of the neural network are set such that diagonal elements of the enhanced lower triangular matrix remain positive.

At 914, interference whitening may be performed on the received signal using a whitening filter that is based on the lower triangular matrix. At 916, bits may be detected and decoded from the received signal based on the interference whitening.

Figure 10:
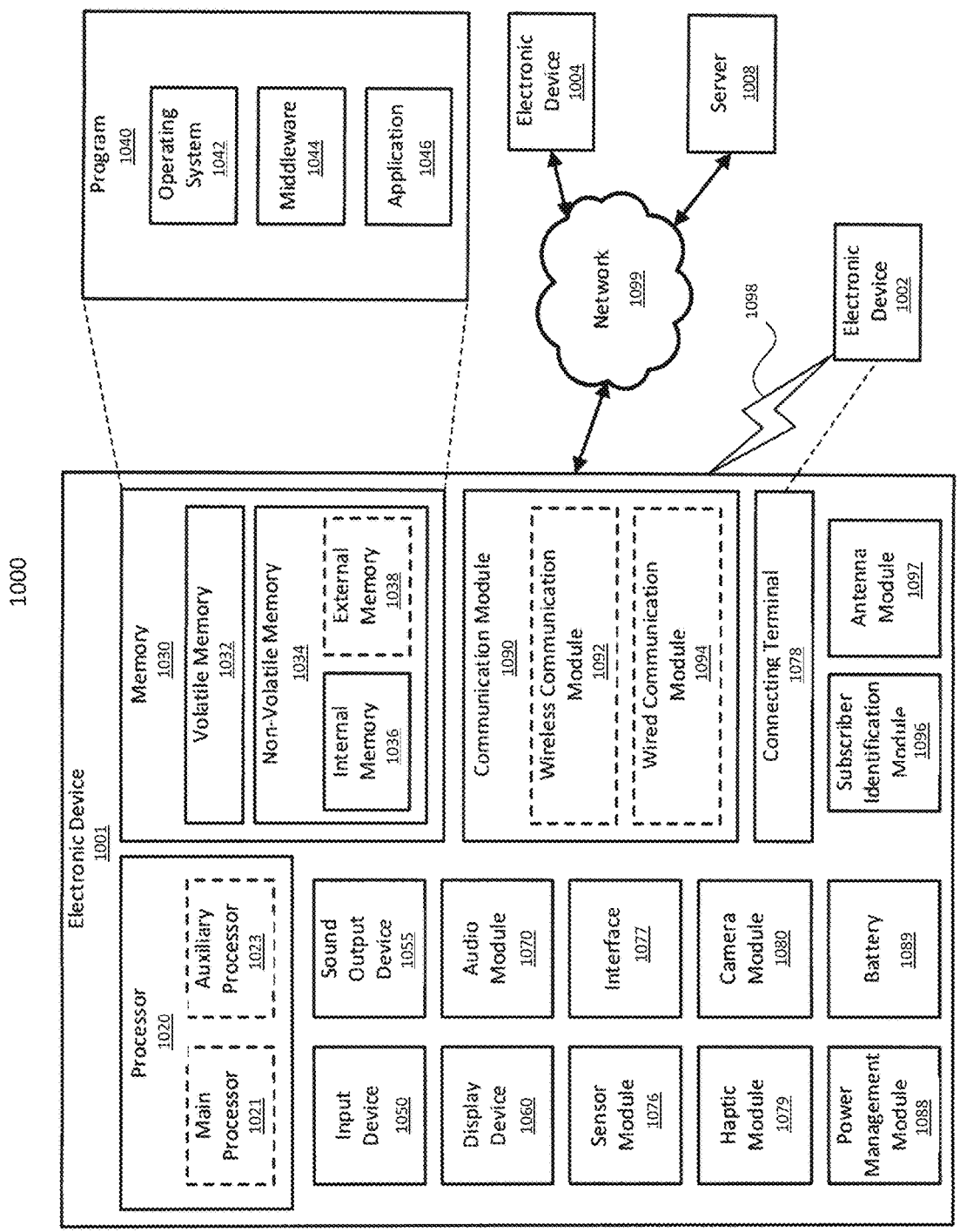
FIG. 10 is a block diagram of an electronic device in a network environment, according to an embodiment.

FIG. 10 is a block diagram of an electronic device in a network environment 1000, according to an embodiment.

Referring to FIG. 10, an electronic device 1001 in a network environment 1000 may communicate with an electronic device 1002 via a first network 1098 (e.g., a short-range wireless communication network), or an electronic device 1004 or a server 1008 via a second network 1099 (e.g., a long-range wireless communication network). The electronic device 1001 may communicate with the electronic device 1004 via the server 1008. The electronic device 1001 may include a processor 1020, a memory 1030, an input device 1040, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) card 1096, or an antenna module 1094. In one embodiment, at least one (e.g., the display device 1060 or the camera module 1080) of the components may be omitted from the electronic device 1001, or one or more other components may be added to the electronic device 1001. Some of the components may be implemented as a single integrated circuit (IC). For example, the sensor module 1076 (e.g., a fingerprint sensor, an iris sensor, or an illuminance sensor) may be embedded in the display device 1060 (e.g., a display).

The processor 1020 may execute software (e.g., a program 1040) to control at least one other component (e.g., a hardware or a software component) of the electronic device 1001 coupled with the processor 1020 and may perform various data processing or computations. The processor 1020 may include the modules described above with respect to FIGS. 6-8, and may enable the individual processes described with respect to each module.

As at least part of the data processing or computations, the processor 1020 may load a command or data received from another component (e.g., the sensor module 1046 or the communication module 1090) in volatile memory 1032, process the command or the data stored in the volatile memory 1032, and store resulting data in non-volatile memory 1034. The processor 1020 may include a main processor 1021 (e.g., a central processing unit (CPU) or an application processor (AP)), and an auxiliary processor 1023 (e.g., a graphics processing unit (GPU), an image signal processor (ISP), a sensor hub processor, or a communication processor (CP)) that is operable independently from, or in conjunction with, the main processor 1021. Additionally or alternatively, the auxiliary processor 1023 may be adapted to consume less power than the main processor 1021, or execute a particular function. The auxiliary processor 1023 may be implemented as being separate from, or a part of, the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). The auxiliary processor 1023 (e.g., an ISP or a CP) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input device 1050 may receive a command or data to be used by another component (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1060 may visually provide information to the outside (e.g., a user) of the electronic device 1001. The display device 1060 may include, for example, a display, a hologram device, or a projector and control circuitry to control a corresponding one of the display, hologram device, and projector. The display device 1060 may include touch circuitry adapted to detect a touch, or sensor circuitry (e.g., a pressure sensor) adapted to measure the intensity of force incurred by the touch.

The audio module 1070 may convert a sound into an electrical signal and vice versa. The audio module 1070 may obtain the sound via the input device 1050 or output the sound via the sound output device 1055 or a headphone of an external electronic device 1002 directly (e.g., wired) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. The sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device 1002 directly (e.g., wired) or wirelessly. The interface 1077 may include, for example, a high-definition multimedia interface (HDMI), a universal serial bus (USB) interface, a secure digital (SD) card interface, or an audio interface.

A connecting terminal 1078 may include a connector via which the electronic device 1001 may be physically connected with the external electronic device 1002. The connecting terminal 1078 may include, for example, an HDMI connector, a USB connector, an SD card connector, or an audio connector (e.g., a headphone connector).

The haptic module 1079 may convert an electrical signal into a mechanical stimulus (e.g., a vibration or a movement) or an electrical stimulus which may be recognized by a user via tactile sensation or kinesthetic sensation. The haptic module 1079 may include, for example, a motor, a piezoelectric element, or an electrical stimulator.

The camera module 1080 may capture a still image or moving images. The camera module 1080 may include one or more lenses, image sensors, image signal processors, or flashes. The power management module 1088 may manage power supplied to the electronic device 1001. The power management module 1088 may be implemented as at least part of, for example, a power management integrated circuit (PMIC).

The battery 1089 may supply power to at least one component of the electronic device 1001. The battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the AP) and supports a direct (e.g., wired) communication or a wireless communication. The communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or a standard of the Infrared Data Association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1092 may identify and authenticate the electronic device 1001 in a communication network, such as the first network 1098 or the second network 1099, using subscriber information (e.g., international mobile sub scriber identity (IMSI)) stored in the sub scriber identification module 1096.

The antenna module 1097 may transmit or receive a signal or power to or from the outside (e.g., the external electronic device) of the electronic device 1001. The antenna module 1097 may include one or more antennas, and, therefrom, at least one antenna appropriate for a communication scheme used in the communication network, such as the first network 1098 or the second network 1099, may be selected, for example, by the communication module 1090 (e.g., the wireless communication module 1092). The signal or the power may then be transmitted or received between the communication module 1090 and the external electronic device via the selected at least one antenna.

Commands or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. All or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:
   generating a vector from a covariance matrix of a received signal;
   inputting the vector to a neural network to obtain an enhanced vector;
   converting the enhanced vector into an enhanced matrix; and
   performing interference whitening on the received signal using a whitening filter based on the enhanced matrix.

2. The method of claim 1, wherein the covariance matrix is a positive definite matrix.

3. The method of claim 1, wherein generating the vector comprises:
   estimating the covariance matrix of the received signal;
   decomposing the covariance matrix into a lower triangular matrix; and
   converting the lower triangular matrix into the vector.

4. The method of claim 3, wherein the covariance matrix is estimated using interference-plus-noise of reference signal (RS) resource elements (REs) of one or more consecutive resource blocks (RBs) in a bandwidth.

5. The method of claim 3, wherein the lower triangular matrix is a lower triangular Cholesky factorization matrix.

6. The method of claim 3, wherein the enhanced matrix comprises an enhanced lower triangular matrix, and activation functions of the neural network are set such that diagonal elements of the enhanced lower triangular matrix remain positive.

7. The method of claim 6, further comprising generating an inverse matrix of the enhanced lower triangular matrix, wherein the interference whitening is performed based on the inverse matrix.

8. The method of claim 7, further comprising detecting and decoding bits from the received signal after interference whitening.

9. The method of claim 6, further comprising converting the enhanced lower triangular matrix into an enhanced covariance matrix that is a positive definite matrix.

10. The method of claim 1, further comprising training the neural network using an ideal enhanced vector and a data set generated under at least one of different interference scenarios, different interference ratios, and different channel models.

11. A user equipment (UE) comprising:
   a processor; and
   a non-transitory computer readable storage medium storing instructions that, when executed, cause the processor to:
      generate a vector from a covariance matrix of a received signal;
      input the vector to a neural network to obtain an enhanced vector;
      convert the enhanced vector into an enhanced matrix; and
      perform interference whitening on the received signal using a whitening filter based on the enhanced matrix.

12. The UE of claim 11, wherein the covariance matrix is a positive definite matrix.

13. The UE of claim 11, wherein, in generating the vector, the instructions further cause the processor to:
   estimate the covariance matrix of the received signal;
   decompose the covariance matrix into a lower triangular matrix; and
   convert the lower triangular matrix into the vector.

14. The UE of claim 13, wherein the covariance matrix is estimated using interference-plus-noise of reference signal (RS) resource elements (REs) of one or more consecutive resource blocks (RBs) in a bandwidth.

15. The UE of claim 14, wherein the enhanced matrix comprises an enhanced lower triangular matrix, and activation functions of the neural network are set such that diagonal elements of the enhanced lower triangular matrix remain positive.

16. The UE of claim 15, wherein the instructions further cause the processor to:
   generate an inverse matrix of the enhanced lower triangular matrix, wherein the interference whitening is performed based on the inverse matrix; and
   detect and decode bits from the received signal after interference whitening.

17. The UE of claim 15, wherein the instructions further cause the processor to convert the enhanced lower triangular matrix into an enhanced covariance matrix that is a positive definite matrix.

18. The UE of claim 13, wherein the lower triangular matrix is a lower triangular Cholesky factorization matrix.

19. The UE of claim 11, wherein the instructions further cause the processor to train deep neural network using an ideal enhanced vector and a data set generated under at least one of different interference scenarios, different interference ratios, and different channel models.

20. A method comprising:
   generating a matrix from a received signal;
   generating an enhanced matrix using learning-based enhancement;
   performing interference whitening on the received signal using a whitening filter based on an inverse of the enhanced matrix; and
   detecting and decoding bits from the received signal after interference whitening.

* * * * *